Patented Aug. 4, 1925.

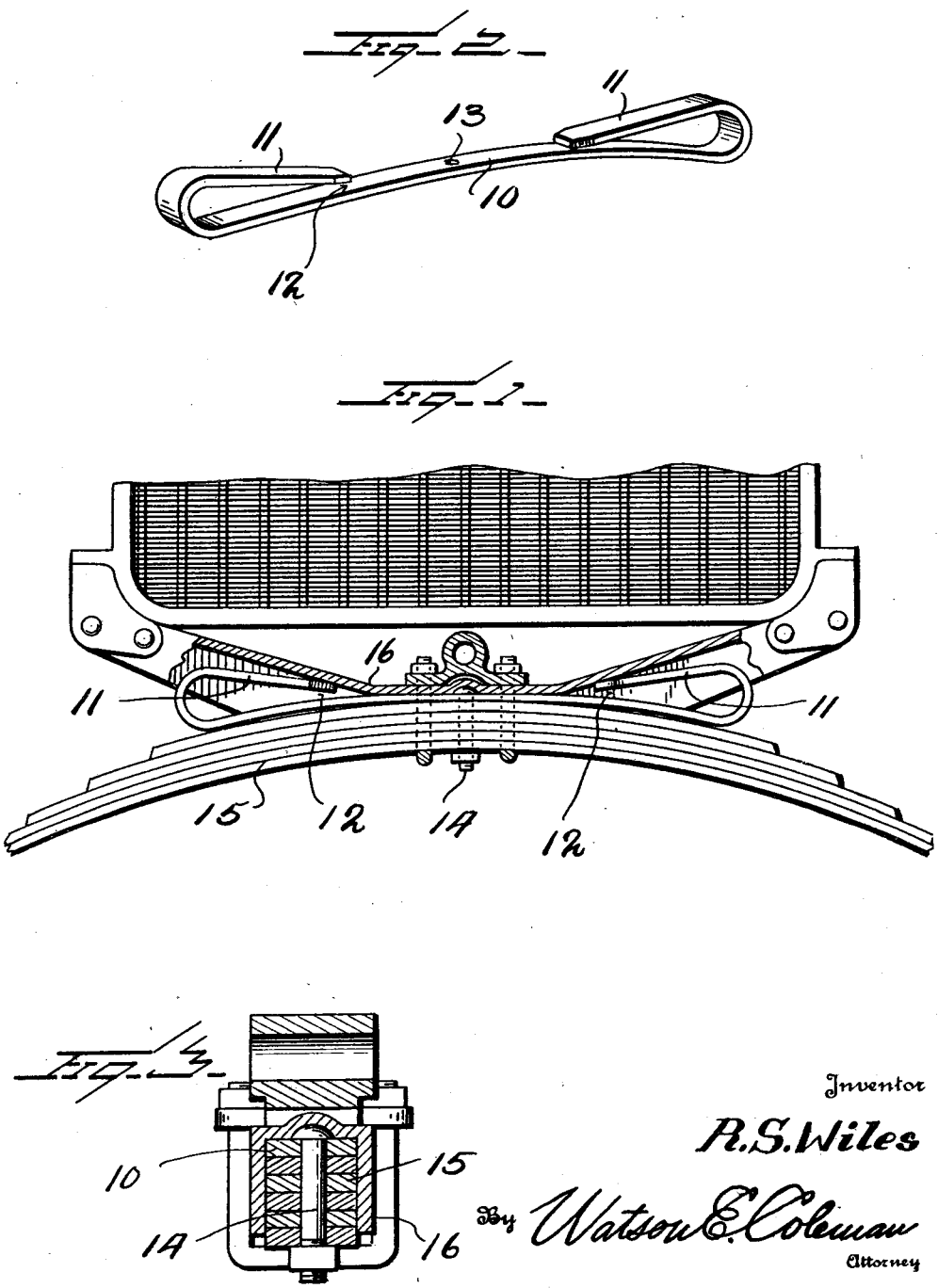

1,548,500

UNITED STATES PATENT OFFICE.

ROBERT STERLING WILES, OF DUNCAN, OKLAHOMA.

SPRING PROTECTOR OR AUXILIARY SPRING.

Application filed October 30, 1924. Serial No. 746,845.

*To all whom it may concern:*

Be it known that I, ROBERT STERLING WILES, a citizen of the United States, residing at Duncan, in the county of Stephens and State of Oklahoma, have invented certain new and useful Improvements in Spring Protectors or Auxiliary Springs, of which the following is a specification, reference being had to the accompanying drawings.

This invention relates to devices used on Ford cars for the purpose of preventing the breaking of the front spring, and the object of the invention is to provide a spring protector or auxiliary spring which, in addition to strengthening the original spring on the forward axle of a Ford car, will prevent the body of the car from swinging from one side to the other.

A further object is to provide a construction of this kind which will not be detrimental to the front clamp on a Ford car and which will not have any tendency to strip the threads on the clamp bolt.

A still further object is to provide a device of this character which, when used on Ford cars having shock absorbers, will not permit the fender to scrape or come in contact with the casing.

Other objects will appear in the course of the following description.

My invention is illustrated in the accompanying drawing, wherein:—

Figure 1 is a front elevation of a portion of a radiator, spring and supporting member of a Ford car, showing my invention applied thereto, the supporting member being partly in section;

Figure 2 is a perspective view of my improved spring protector;

Figure 3 is a vertical section through the middle of the spring and the supporting member showing my protector in place;

My improved protector or auxiliary spring comprises a strip of spring metal having normally a thickness of about one-quarter of an inch, which is bent to form an upwardly bowed middle portion 10 and at the ends the strip is bent upward and then inward or toward the middle to provide spring leaves 11, these spring leaves being spaced from the body of the spring, as at 12. The body of the spring at the center is formed with an aperture 13 for the passage of the center bolt 14.

This device is disposed upon the spring 15 in the manner illustrated in Figure 1, and between this spring 15 and the cross beam 16 upon which the body of the automobile is supported and which is disposed just below the fender of the automobile. This beam 16 is channel-shaped so as to embrace the spring 15 and the upwardly bowed portion 10 of my device lies upon the upwardly bowed middle portion of the spring, with the portions 11 extending inward and downward at a slight angle approximately the same as the angle of the upper wall of the beam 16 so that this beam 16 rests upon these open spring bights 11.

With this construction, any downward movement of the body relative to the springs is resisted by the parts 11 which are resiliently held against closing downward against the body of the spring. This device, as will be seen, not only strengthens the original spring and eliminates a good deal of the tendency to break, but prevents the body of the car from swinging from one side to the other because the beam 16 rests upon these upwardly inclined portions 11 of my spring. The spring is entirely concealed from view within the channel-shaped beam and is equal to an additional leaf given to the spring, thus performing two functions. As constructed, when in place there is no tendency on the part of this spring to strip the threads on the clamp bolt nor are the fenders allowed to scrape or come in contact with the casing.

It will be understood that this device is particularly adapted for Ford automobiles, which are relatively weak at this point, and in which the body has a tendency to rock upon the middle of the spring transversely of the line of draft. My device increases the effective point of contact of the beam with the spring 15, thus reducing or preventing this lateral swinging tendency.

On rough roads or when the car strikes an obstruction which raises one of the front wheels and tends to cause the body of the car to rock from side to side, this attachment tends to stabilize the car and prevent the excessive rocking due to rough roads or jars, and thus keeps the spring from moving sidewise on the clamp bolt and strip the threads and shear the same. Many Ford cars do not have a double clamp bolt but only a single bolt and where this is used this attachment tends to prevent any rocking of the car which is disastrous on the front springs. Where shock absorbers are used in connection with a car such as a Ford, there is a greater tendency to sidewise motion due to the elasticity gained by the use of the shock absorbers. This causes the car to rock to such an extent that the fenders often scrape on the wheels. My device greatly eliminates this tendency to rock and thus prevents the fenders from coming in contact with the front tires.

I claim:—

The combination with an automobile having an upwardly bowed front spring and a supporting beam channel-shaped in cross section fitting over the middle of said spring and having upwardly divergent end portions, of a spring protector and auxiliary spring disposed within the beam and resting upon the upwardly bowed spring and comprising a relatively thick strip of resilient metal having a width approximately equal to that of the spring, the middle portion of said strip being upwardly bowed so as to fit upon the spring, the extremities of the strip being upwardly bent and then centrally, medially and downwardly bent in approximately a straight line normally disposed at a less angle to the horizontal than the angle of the upwardly divergent end portions of the supporting beam, but the ends of said portions being spaced from the body of the spring.

In testimony whereof I hereunto affix my signature.

ROBERT STERLING WILES.